United States Patent [19]

Choma et al.

[11] Patent Number: 5,390,808

[45] Date of Patent: * Feb. 21, 1995

[54] FILLER TUBE FOR LIQUID CONTAINERS

[75] Inventors: Kevin R. Choma, Canton; Jack L. Boldt, Jr., Waterford, both of Mich.

[73] Assignee: General Signal, Stamford, Conn.

[*] Notice: The portion of the term of this patent subsequent to Oct. 19, 2010 has been disclaimed.

[21] Appl. No.: 20,577

[22] Filed: Feb. 23, 1993

Related U.S. Application Data

[63] Continuation-in-part of Ser. No. 935,542, Aug. 26, 1992, Pat. No. 5,253,773.

[51] Int. Cl.6 .............................................. F16L 13/14
[52] U.S. Cl. .................................. 220/86.2; 285/202; 285/204; 285/222
[58] Field of Search ................... 220/86.2, 465, 601, 220/661; 285/162, 202, 204, 222

[56] References Cited

U.S. PATENT DOCUMENTS

| | | | |
|---|---|---|---|
| 1,875,908 | 9/1932 | Zarobsky | 220/86 R |
| 2,031,838 | 2/1936 | Leonhart | 113/121 |
| 2,100,168 | 11/1937 | Melrath | 285/204 |
| 2,133,852 | 10/1938 | Dillhoefer | 285/204 |
| 2,339,255 | 1/1944 | Dodson | 285/202 X |
| 2,466,076 | 4/1949 | Bentley et al. | 220/86 R |
| 2,798,742 | 7/1957 | Parish, Jr. et al. | 285/204 X |
| 3,358,357 | 12/1967 | Defauio | 285/202 X |
| 3,448,892 | 6/1969 | Thieman | 220/86 R |
| 4,027,910 | 6/1977 | Farelli | 296/10 |
| 4,122,968 | 10/1978 | Germain | 220/86 R |
| 4,185,844 | 1/1980 | Hubbard et al. | 220/86 R X |
| 4,233,726 | 11/1980 | Williams | 29/507 |
| 4,323,166 | 4/1982 | Maeroff | 220/86 R |
| 4,334,703 | 6/1982 | Arthur et al. | 285/222 |
| 4,379,574 | 4/1983 | Leichtl | 220/86.2 X |
| 4,679,698 | 7/1987 | Thorn et al. | 220/86 R |
| 4,690,293 | 9/1987 | Uranishi | 220/86 R |
| 4,759,459 | 7/1988 | Bailey et al. | 220/86 R |
| 4,915,249 | 4/1990 | Anhegger et al. | 220/86 R |
| 4,955,950 | 9/1990 | Seiichi et al. | 141/46 |
| 4,995,433 | 2/1991 | Beicht et al. | 141/312 |
| 5,042,678 | 8/1991 | Munguia | 220/254 |
| 5,069,260 | 12/1991 | Shea | 141/292 |
| 5,111,858 | 5/1992 | Aittama et al. | 141/312 |
| 5,253,773 | 10/1993 | Choma et al. | 220/86.2 |

FOREIGN PATENT DOCUMENTS

291187 6/1928 United Kingdom.
9111342 8/1991 WIPO.

*Primary Examiner*—Steven M. Pollard
*Attorney, Agent, or Firm*—Harness, Dickey & Pierce

[57] ABSTRACT

The present invention relates to filler tubes and, more particularly, to fuel filler tubes and methods of attaching them to automobile fuel tanks. The fuel filler tube of the present invention includes an inlet tube, a retainer member, sealing means and a fuel tank having a downwardly extending diameter portion. The retainer is disposed over the downwardly extending diameter portion and adhered to the tank. The inlet tube is then inserted into the fuel tank aperture until the inlet tubes annular flange engages the fuel tank's annular lip. A crimping tool is then inserted through the axial bore of the inlet tube and a plurality of bearings contained on the crimping tool are forced radially outwardly to thereby crimp the inlet tube and downwardly extending diameter portion together. The retainer member includes a plurality of recessed areas for hosting the expanded inlet tube and tank portions.

20 Claims, 6 Drawing Sheets

FILLER TUBE FOR LIQUID CONTAINERS

This is a continuation-in-part of application of the U.S. patent application Ser. No. 07/935,542, filed Aug. 26, 1992, now U.S. Pat. No. 5,253,773.

BACKGROUND OF THE INVENTION

1. Technical Field

The present invention relates to filler tubes for liquid containers and, more particularly, to filler tubes which are attachable to the fuel flange of an automobile fuel tank and methods of attaching the same.

2. Discussion of Related

Fuel filler tubes are tubular conduits which extend from a vehicle's fuel tank and serve as a mechanism for transporting gasoline from the end of the fuel pump hose to the fuel tank. Typically, these fuel filler tubes are permanently attached to the vehicle's fuel tank during the manufacturing process by first cleaning an annular flange provided on the fuel flange and then brazing a metallic fuel filler tube to the fuel flange. This method of attaching fuel filler tubes, however, is unnecessarily time consuming. Further, this method adds to the manufacturing costs of the vehicle.

Recently, there has been an attempt to move away from the standard brazed fuel filler tube assemblies and toward attachable filler tube assemblies which are mechanically coupled to the fuel tank. One disadvantage many of these mechanically attachable fuel filler tube assemblies have is that they require an excessive number of parts to facilitate the connection between the fuel tank and the fuel filler tube. A large number of parts necessarily result in cost disadvantages both in the manufacture and assembly of the fuel filler tubes.

SUMMARY OF THE INVENTION

The present invention relates to a fuel filler tube assembly which includes an inlet tube, a sealing element, and a retainer member which fits over an annular flange provided on the vehicle's fuel tank. A specially designed tool is also disclosed for mechanically attaching the inlet tube to the vehicle's fuel tank. The inlet tube is preferably made of rolled steel tubing and the retainer member is preferably made of hot rolled steel. The sealing element can be made from any suitable elastomeric material.

Generally, the inlet tube of the present invention is provided with various diameter portions and a nosed over end for receipt of a quick connect coupling.

The present invention further relates to the method of attaching the filler tube assembly to the fuel tank. The method involves fitting the inlet tube within the fuel tank aperture and expanding the diameter of a section of the inlet tube with a specially designed tool to crimp the inlet tube onto the fuel tank.

Additional objects and advantages of the present invention will become apparent from reading the detailed description of the preferred embodiments which make reference to the following set of drawings in which:

DETAILED DESCRIPTION OF THE PREFERRED EMBODIMENT

Figures 1, 2:
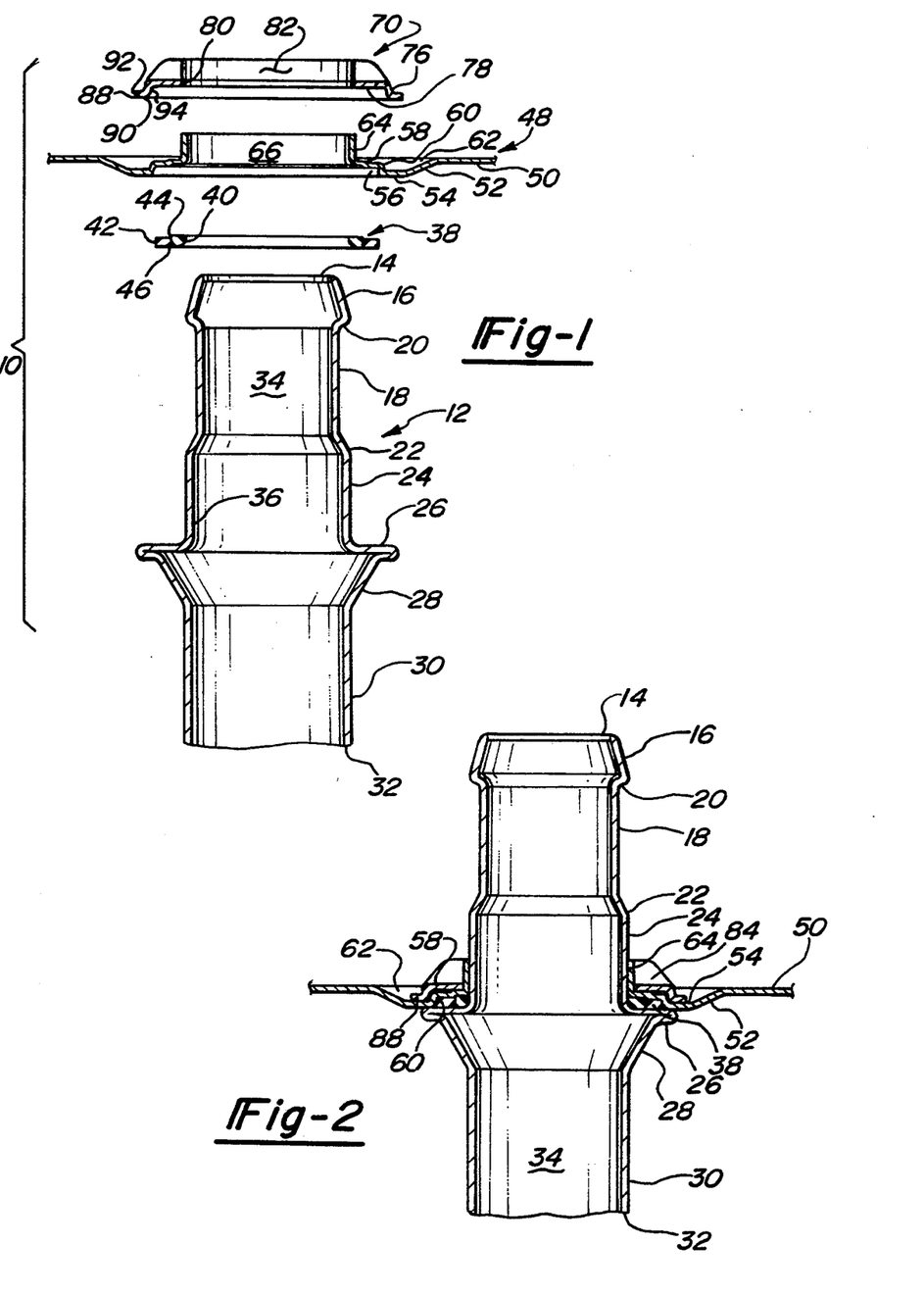
FIG. 1 is an exploded view of a filler tube assembly according to the teachings of the present invention.
FIG. 2 is a cross-sectional view of the initial connection between the inlet tube and the vehicle fuel tank of FIG. 1 according to the teachings of the present invention.

Referring to FIG. 1, an exploded cross-sectional view of a first filler tube assembly 10 embodiment according to the teachings of the present invention is shown as comprising an inlet tube 12, a sealing element 38, a modified fuel tank 48, and a retainer member 70. The inlet tube 12 is typically formed from rolled steel which is strong, yet selectively deformable and includes a plurality of sections having varying diameters. The leading end 14 of the inlet tube 12 typically includes a nosed over or frustoconical shaped first diameter portion 16 and a reduced second diameter portion 18. This reduction in diameter between the first and second diameter portions provides a step 20 which facilitates attachment of a quick connect coupling (not shown) over the leading end of the inlet tube. A third transitional diameter portion 22 is provided with an increasing diameter in the direction of a fourth diameter portion 24 which is enlarged. At one end this fourth diameter portion extends from the third diameter portion and at the opposite end is provided with an annular flange 26 which extends radially outwardly. Extending below the annular flange 26 is a fifth inwardly tapering transitional diameter portion 28 which leads to a sixth diameter portion 30 occurring at the trailing end 32 of the inlet tube. An axial bore 34 which is defined by the inner surface 36 of the inlet tube extends the length of the inlet tube 12 and is provided to allow for transporting fuel from a conduit (not shown) such as a gasoline pump hose to the fuel tank 48. It should be understood that the inlet tube 12 can be modified to various designs provided the annular flange is included.

Sealing element 38 which is included to provide a fluid tight seal between the inlet tube 12 and the fuel tank 48 generally includes an inner diameter 40, an outer diameter 42, a top surface 44 and a bottom surface 46. Typically the sealing element is formed from an elastomeric material which is readily deformable to conform to various shapes. One such sealing element is the 90 durometer gasket available from Gosher Rubber, Inc., of Snow Hill, N.C. Another useful sealing element is a standard O-ring which is commercially available.

The fuel tank 48 is provided with a body portion 50 and a specially adapted sealing arrangement located about the circumference of the inlet aperture 66 for receiving the inlet tube 12. The fuel tank 48, and more particularly, the sealing arrangement of the fuel tank is made from a selectively deformable metal such that the sealing arrangement can be stamped or pressed to the desired shape. The sealing arrangement includes a tapering transitional section 52, an annular recess 54, cleft 56, an annular ridge 58, a step 60, a gap 62 and an upwardly projecting annular sleeve 64 to facilitate connection between the filler tube 12 and the fuel tank 48.

Figure 6:
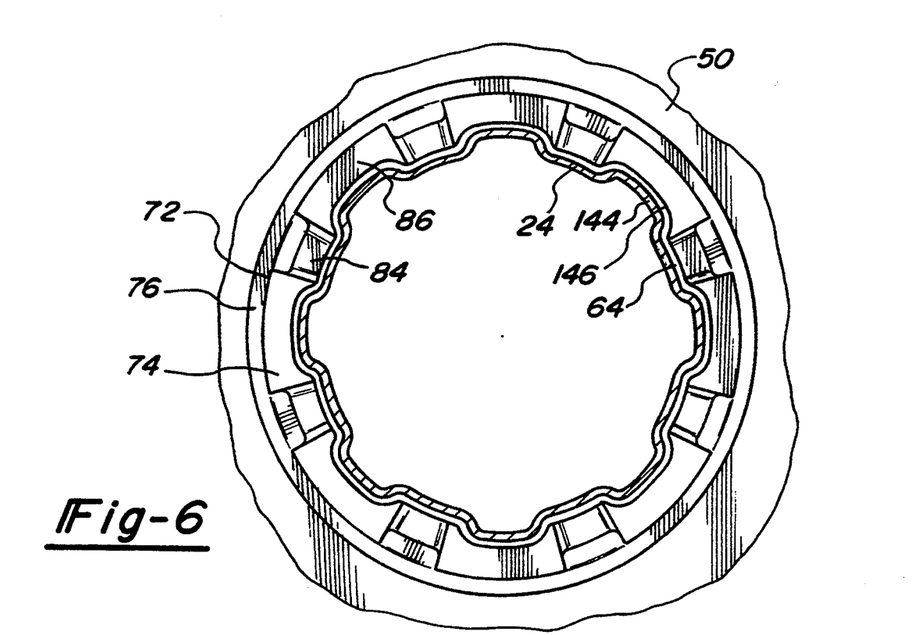
FIG. 6 is a partial cross-sectional view of the retainer member taken along line 6—6 of FIG. 5 illustrating the expansion of the inlet tube about the retainer according to the teachings of the present invention.

Retainer member 70, as shown more clearly in FIG. 6, is typically formed by stamping hot rolled gage steel to the desired form. Hot rolled gage steel is preferred since upon full cooling the retainer member is highly resistant to deformation. The retainer member 70 which is essentially ring shaped includes an annular top portion 72 and an annular bottom portion 88. The top portion 72 includes a first top surface 74 and a second top surface 76, a bottom surface 78 and an inner surface 80 which defines the axial bore 82. Extending from the first top surface 74 are a plurality of equidistantly spaced apart substantially trapezoidal shaped lugs 84 having recessed areas 86 disposed between adjacent lugs. Extending downwardly about the periphery of the bottom surface 78 is an annular bottom portion 88 which includes a bottom surface 90, an outer wall 92 and an inner wall 94 which forms a step between the bottom surface 78 of the top portion 72 and the bottom surface 90 of the bottom portion 88.

Figure 12:
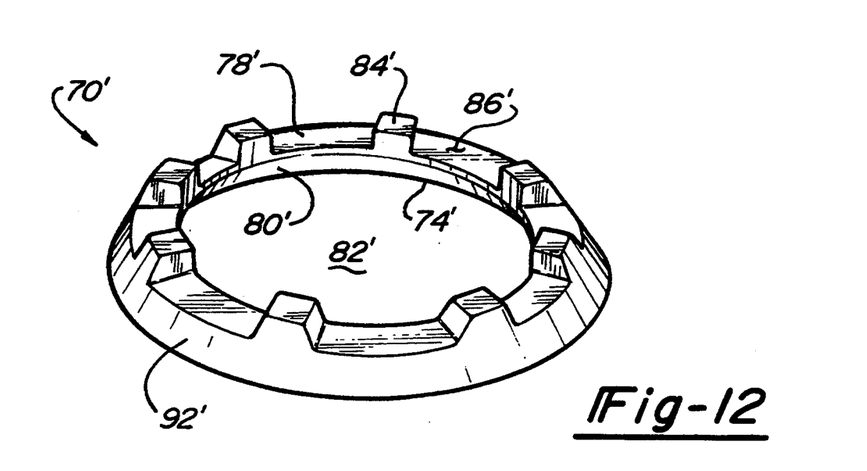
FIG. 12 is a partial cross-sectional view of an alternative retainer member embodiment according to the teachings of the present invention.

With reference to FIG. 12 an alternative preferred retainer member embodiment 70' is shown. The retainer member 70' includes a ring shaped body having a bottom surface 78' and a top surface 74' wherein the top surface 74' has a greater circumference than the bottom surface. The retainer member 70' also includes an inner surface 80' defining a bore 82' and an outer surface 92'. The inner surface 80' and the outer surface 92' taper inwardly from the top surface 74' to the bottom surface 78' such that the diameter of the inner and outer surfaces is greater proximate to the top surface 74' than the bottom surface 78'. The bottom surface 78' includes a plurality of equidistantly spaced art downwardly extending lugs 84' having recessed areas 86' disposed between adjacent lugs.

The method for selectively attaching the filler tube assembly embodiment as shown in FIGS. 1 and 2 to a fuel tank will now be described in further detail. Under this method the filler tube assembly is attached to the fuel tank for inside a section of the fuel tank prior to fully forming the tank structure. Typically, fuel tanks for use in automotive vehicles come in two or more sections which are crimped and welded together to form the overall tank structure. It should be understood that either retainer member 70 or 70' could be utilized under this method of selectively attaching the filler tube assembly to the fuel tank. Generally, retainer member 70 will be utilized when a gasket type sealing element is used and retainer member 70' will be utilized when an O-ring sealing element is utilized.

Under the embodiment of FIGS. 1 and 2, initially the gasket 38 is positioned over the leading end 14 inlet tube 12 and advanced onto the inlet tube such that the inner diameter 40 engages the fourth diameter portion 24 of the inlet tube 12 and comes to rest against the annular flange 26. The leading end 14 of the inlet tube 12 is then inserted through the axial bore 66 of the annular sleeve 64 and advanced until the annular flange 26 engages the annular recess 54 of the fuel tank 48. This arrangement retains the gasket 38 within the cleft 56 defined by the area occurring between the annular flange 26, annular ridge 58, the step 60 and fourth diameter section 24 of the inlet tube. Preferably, the inner diameter of the annular sleeve 64 fits tightly over the fourth diameter portion 22 to temporarily secure the inlet tube to the tank prior to carrying out the crimping step. Additionally, the inlet tube may be adhesively attached along the annular flange 26 to the annular ridge 58 of the fuel tank 48 by a metal binding adhesive.

Figure 3:
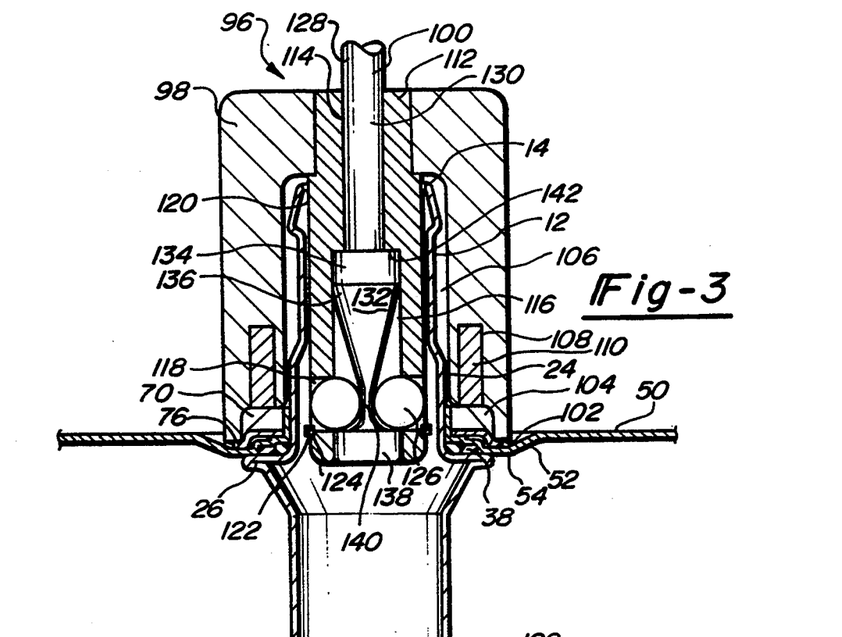
FIG. 3 is a cross-sectional view illustrating alignment of the crimping tool to carry out the method of mechanically attaching the inlet tube of FIG. 1 to the vehicle fuel tank according to the teachings of the present invention.
Figure 4:
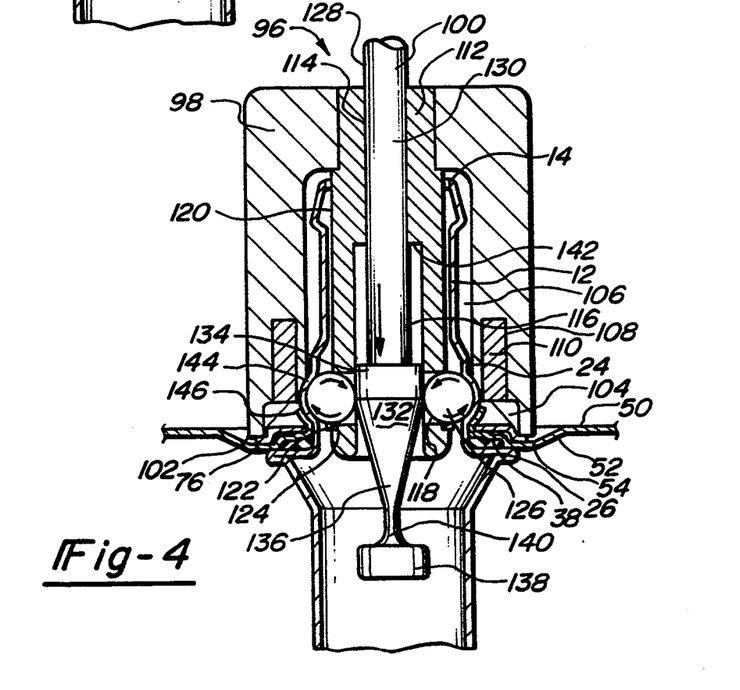
FIG. 4 is a cross-sectional view illustrating the method of mechanically attaching the inlet tube of FIG. 1 to the vehicle fuel tank according to the teachings of the present invention.
Figure 5:
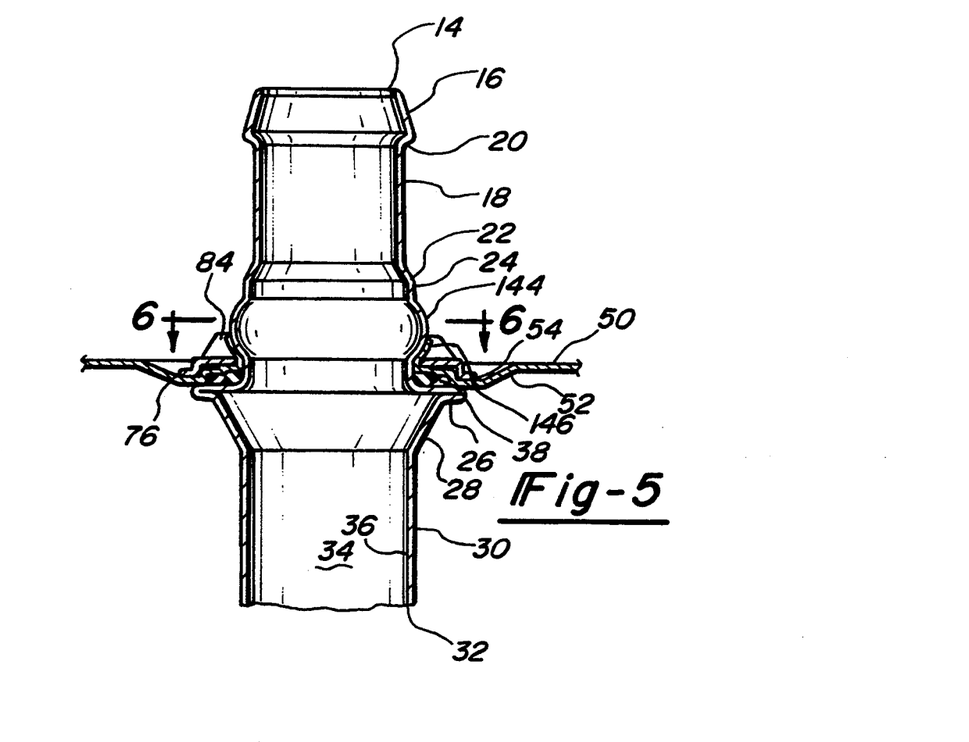
FIG. 5 is a cross-sectional view illustrating the inlet tube of FIG. 1 mechanically attached to the vehicle's fuel tank according to the teachings of the present invention.

Referring to FIGS. 3 and 4, cross-sectional views illustrating a first crimping tool embodiment utilized to carry out the method of permanently attaching the filler tube assembly 10 to the fuel tank 48 are provided. With the filler tube components in place, the crimping tool 96 is utilized to mechanically attach the filler tube assembly to the fuel tank. The crimping tool 96 as depicted in FIGS. 3 and 4 is generally used under the embodiment of FIGS. 1 and 2 wherein the retainer member is attached on the outside of the tank.

The crimping tool 96 includes a housing 98 and a ram assembly 100. The housing 98 which is typically formed of a metallic or ceramic material having a relatively low electrical conductivity generally includes a leading edge 102, a first axial bore section 104, a second axial bore section 106 and a plurality of spaced apart cavities 108 extending into the housing from the first bore section 104. The first bore section 104 is provided with a diameter which is sufficiently large to fit over the retainer member 70 and yet allow the housing edge 102 to come to rest against the second top surface 76 of the retainer member 70. The second bore portion 106 has a diameter slightly larger than the fourth diameter portion 24 of the inlet tube 12 and a depth sufficient to receive the entire inlet tube portion located between the annular flange 26 and the leading end 14.

The cavities 108 house magnetically charged inserts 110 which assist in properly aligning the retainer member 70 to carry out the crimping step. The magnetically charged inserts 110 are spaced apart in the same proportions as the lugs 84 such that the magnetically charged inserts attract the lugs 84 causing the retainer member to rotate into the proper alignment for carrying out the crimping step. Although magnetically charged metallic inserts are preferably used it is contemplated that the cavities 108 can be used to house an electro-magnetic device or devices to assist in aligning the retainer member.

The ram assembly 100 includes a guide member 112 which extends from the housing 98 into the first and second axial bore sections 104 and 106, respectively, and is disposable within the axial bore 34 of the inlet tube 12. The guide member 112 is provided with a first bore portion 114 which maintains the shaft 130 in axial alignment and a second bore portion 116 for hosting the head portion 132 of the ram member 128 which is actuatable via a hydraulic press (not shown) or another suitable driving mechanism. The guide member 112 also includes a plurality of spaced apart apertures 118 disposed between the outer surface 120 of the guide member 112 and the second axial bore portion 116 for hosting bearings 126. The bearings 126 typically have an overall cylindrical shape with slightly rounded edges and are held in an upright position by the apertures 118. The guide member 112 is also provided with a keeper 122 which is disposed around the outer surface 120 of the guide member such that the bearings engage the keeper 122 as the bearings are forced radially outwardly. The keeper 122 serves to assist in retaining the bearings within the guide member 112 while the bearings are being forced radially outwardly. Typically the keeper 122 is an elastomeric ring disposed within an annular groove 124, however it is contemplated that other suitable mechanical retainers such as ring shaped clips could also be used as keepers. The ram member 128 includes a shaft portion 130 and a head portion 132. The shaft portion is disposed within the first axial bore portion 114 of the guide member 112 and the head portion 132 is at least partially disposed within the second axial bore portion 116 during each stage of the crimping process. The head portion 132 includes a shoulder 134, a downwardly tapering frustoconical shaped neck 136 and a plate 138 attached to the neck 136 at the stem 140.

Once the retainer member 70 has been properly aligned by the magnetic inserts 110, the ram member 128 of the crimping tool 96 can then be actuated to carryout the crimping step. As the ram member 128 is actuated and driven downwardly in the direction of the trailing end 32 of the inlet tube 12 from a normal position seated against step 142, the frustoconical neck increasingly engages the bearings 124 and forces them radially outwardly into the fourth diameter portion 24 of the inlet tube. This in turn causes the inlet tube 12 to expand along the fourth diameter portion 24 as the bearings increasingly contact the inlet tube to form radially outwardly expanded portions 144. Likewise, the annular sleeve 64 of the fuel tank 48 also expands relative to the expansion occurring along the fourth diameter portion of the inlet tube to form radially outwardly expanded portions 146 contiguously disposed over the expanded portions 144 of the inlet tube 12. The rotation of the bearings 126 cause the guide member 112 to be forced downwardly thus forcing the housing 98 against the retainer member 70 and tank 48 and the inlet tube 12 to be drawn upwardly in the direction of the crimping tool 96. As a result of these oppositely disposed forces the inlet tube 12 is expandable radially about the fourth diameter portion to alleviate these forces.

Once the ram member 128 has been actuated to a set point and the crimping step has been carried out, the ram member 128 is retracted such that the shoulder 134 engages the step 142 provided between the first and second bore portions of the guide member 112. The crimping tool can then be removed from the filler tube assembly 10 by withdrawing the guide member 112 from the axial bore 34 of the inlet tube 12. As the guide member 112 is removed the bearings 126 engage the inner surface 36 of the inlet tube diameter portions causing the bearings 126 to be pushed inwardly to seat against the stem 140 of the ram member 128.

Figures 7, 8:
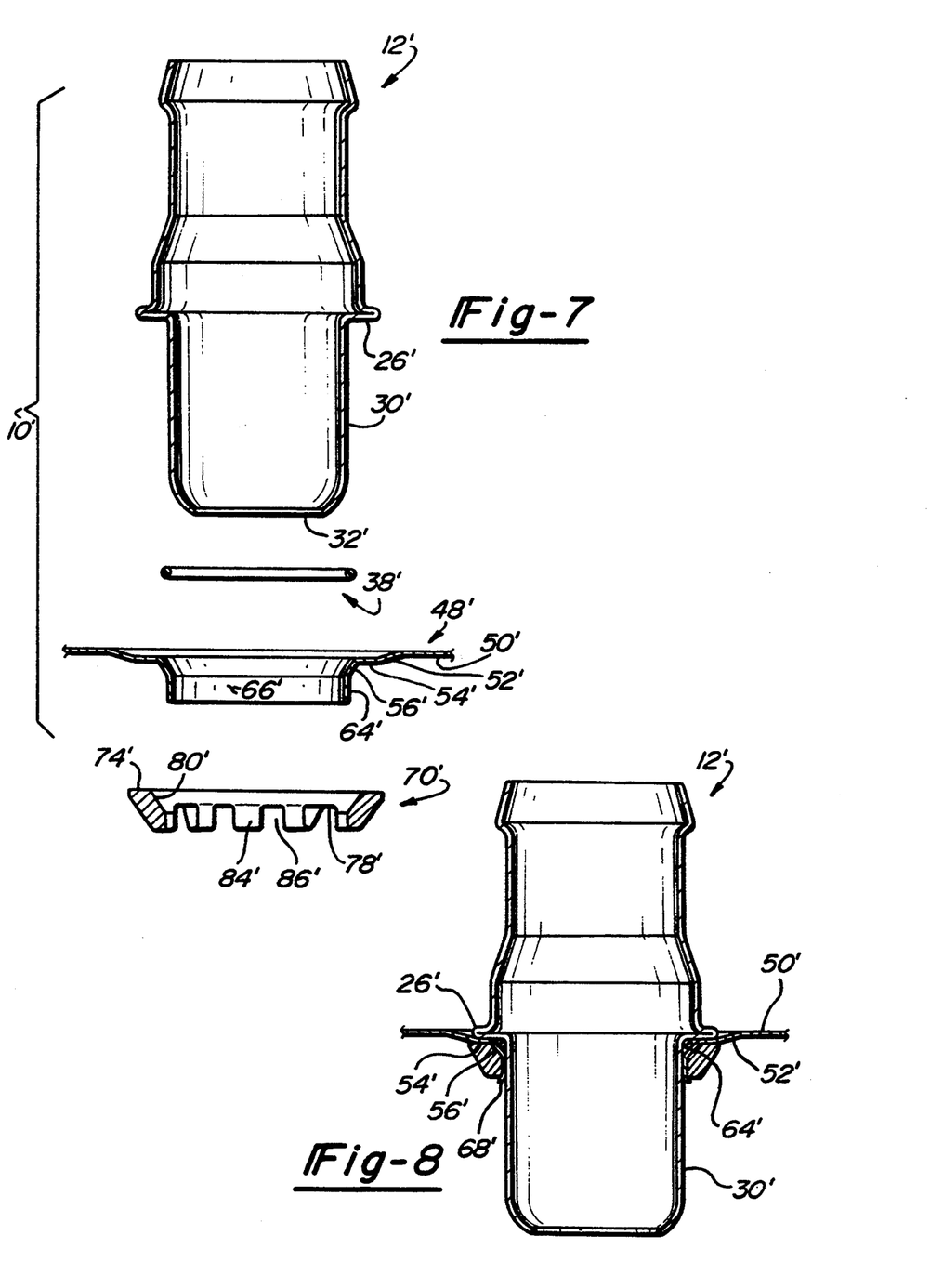
FIG. 7 is an exploded view of an alternative filler tube assembly according to the teachings of the present invention.
FIG. 8 is a cross-sectional view of the initial connection between the inlet tube and the vehicle fuel tank of FIG. 7 according to the teachings of the present invention.

Under an alternative filler tube assembly embodiment 10' as shown in FIGS. 7 and 8 the retainer member 70' is attached to the inside of the tank 48' and a slightly different crimping tool 96' embodiment is utilized. The inlet tube 12' as used in this embodiment is essentially the same as the inlet tube 12 used in the first filler tube assembly 10 with the exception of a relatively cylindrical shaped diameter portion 30' occurring between the annular flange 26' and the trailing end 32', therefore like reference numerals will be used for like features of the embodiments. The tank assembly is slightly different in that the tank 48' includes a body portion 50' and a sealing arrangement including a first tapering transitional section 52', an annular recess 54', a second tapering transitional section 56' and a downwardly extending annular sleeve 64'.

The method of attaching the filler tube assembly embodiment as shown in FIG. 7 and 8 to the alternative fuel tank embodiment involves positioning the retainer member 70' over the downwardly extending annular sleeve 64' of the fuel tank 48'. Once the retainer member has been positioned over the annular sleeve 64' such that the top surface 74' of the retainer member 70' abuts the bottom surface of the annular recess 54' and the inner surface 80' of the retainer member 70' seats against the second transitional section 56', the annular sleeve 64' is expanded radially outwardly about the trailing end 68' to temporarily secure the retainer member 70' to the fuel tank prior to carrying out the crimping step. Alternatively, the retainer member can be adhesively bonded over the annular sleeve 64' of the fuel tank or otherwise mechanically attached.

Once the retainer member 70' is attached to the fuel tank the sealing element 38' is positioned over the trailing end 32' of the inlet tube 12' and advanced along diameter portion 30' until the sealing element comes to rest against the annular flange 26'. The trailing end 32' of the inlet tube is then inserted through axial bore 66' of the annular sleeve 64' until the annular flange 26' comes to rest against the annular recess 54' and the sealing element 38' seats within the second transitional portion 56' of the fuel tank 48'. The filler tube assembly 10' is now properly set to carry out the crimping step.

Figure 9:
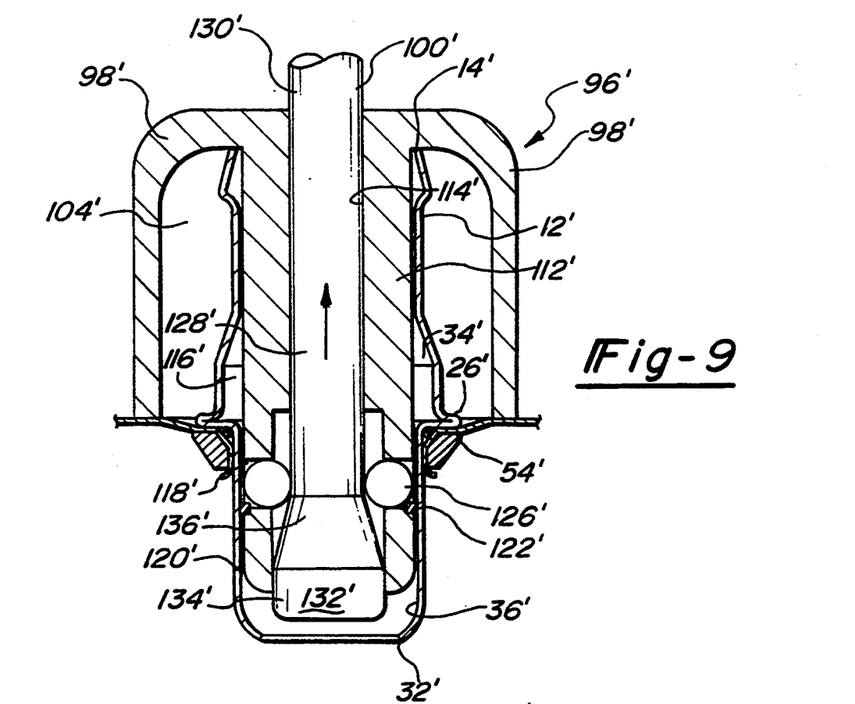
FIG. 9 is a cross-sectional view illustrating alignment of the crimping tool to carry out the method of mechanically attaching the inlet tube of FIG. 7 to the vehicle fuel tank according to the teachings of the present invention.
Figure 10:
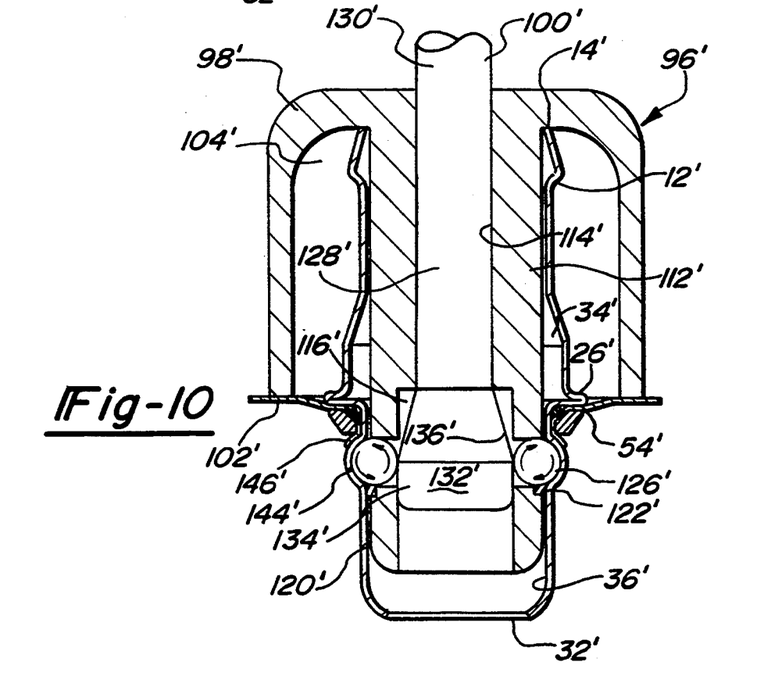
FIG. 10 is a cross-sectional view illustrating the method of mechanically attaching the inlet tube of FIG. 7 to the vehicle fuel tank according to the teachings of the present invention.
Figure 11:
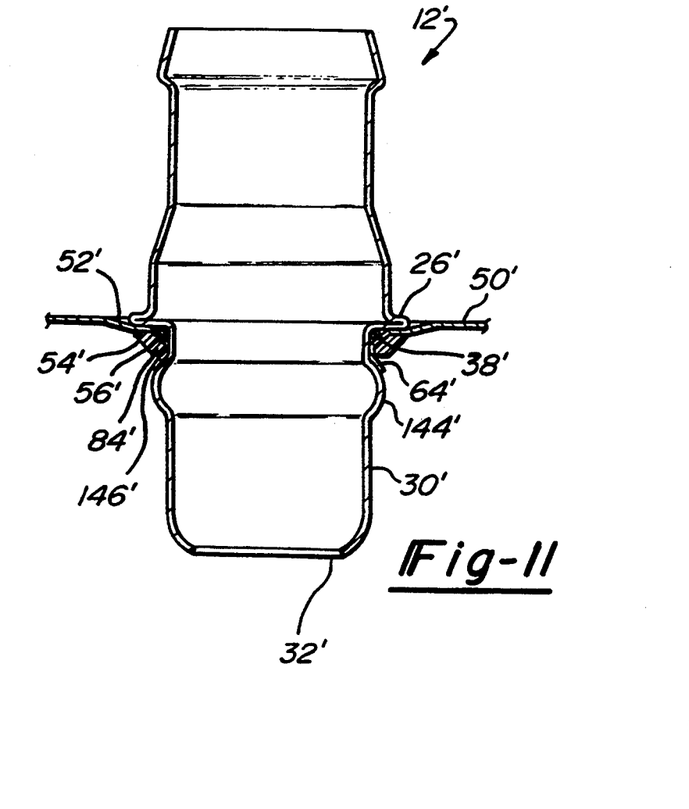
FIG. 11 is a cross-section view illustrating the inlet tube of FIG. 7 mechanically attached to the vehicle's fuel tank according to the teachings of the present invention.

Referring to FIGS. 9 and 10, cross-sectional views illustrating a second crimping tool embodiment utilized to carryout the method of permanently attaching a filler tube assembly 10' to the fuel tank 48' are provided. The crimping tool 96' as depicted in FIGS. 9 and 10 is generally used in association with the filler tube assembly embodiment of FIGS. 7 and 8 wherein the retainer member is attached to the inside of the tank. The crimping tool 96' includes a housing 98' and a ram assembly 100'. The housing 98' again is typically formed of a metallic or ceramic material and includes a leading edge 102' and an axial bore section 104'. The axial bore 104' is sufficiently large to fit over the inlet tube 12' and has a depth which sufficient to receive the entire inlet tube portion located between the annular flange 26' and the leading end 14'.

The ram assembly 100' includes a guide member 112' which extends from the housing 98' and through the axial bore 104' of the housing 98'. The guide member 112' is sufficiently long to extend well into the cylindrically shaped diameter portion 30' located below the annular flange 26'. The guide member 112' which is disposable within the axial bore 34' of the inlet tube 12' is provided with a first bore portion 114' and a second bore portion 116' for hosting the ram member 128' which is actuatable via a hydraulic press (not shown) or another suitable driving mechanism. The guide member 112' also includes a plurality of spaced apart apertures 118' disposed between the outer surface 120' of the guide member 112' and the second axial bore portion 116' for hosting bearings 126'. The bearings 126' typically have an overall cylindrical shape with slightly rounded edges and are held in an upright position by the apertures 118'. Again the outer surface 120' of the guide member 112' includes a keeper 122' which is disposed around the outer surface such that the bearings 126' engage the keeper 122' as the bearings are forced radially outwardly.

The ram member 128' includes a shaft portion 130' and a head portion 132'. The shaft portion 130' is disposed within the first axial bore portion 114' of the guide member 112' and the head portion 132' is at least partially disposed within the second axial bore portion 116'. The head portion 132' includes a tapering frustoconical shaped neck 136' and a relatively cylindrically shaped shoulder 134'.

Once the crimping tool 96' has been properly aligned such that the apertures are disposed substantially in line with the recesses 86' located between the lugs 84' of the retainer member 70', the ram member 128' can be actuated to carryout the crimping step. As the ram member 128' is actuated and drawn upwardly in the direction of the leading end 14' of the inlet tube from a normal position wherein the shoulder 134' extends partially outside of the second axial bore section 116' of the guide member 112', the frustoconical neck 136' increasingly engages the bearings 126' and forces them radially outwardly into the relatively cylindrically shaped diameter portion 30' of the inlet tube 12'. This in turn causes the inlet tube 12' to expand along the diameter portion 30' to also form radially outwardly expanded portions 144' as the bearings increasingly contact the inlet tube. As the diameter portion 30' expands radially, the annular sleeve 64' also expands relative to the expansion occurring along the diameter portion 30' of the inlet tube 12' to also form radially outwardly expanded portions 146'. The rotation of the bearings 126' causes the inlet tube 12' to be drawn downwardly in the direction of the trailing end 32' of the inlet tube. The inlet tube is stopped however from being drawn downwardly by the abutting relationship between the annular flange 26' and the annular recess 54'. As a result of this force being exerted on the inlet tube, the inlet tube 12' expands radially about the diameter portion 30' to alleviate these forces. As a further result of this radial expansion of the inlet tube 12' about the diameter portion 30' the annular sleeve 64' expands radially outwardly in response along the bulges caused in the inlet tube thereby causing the annular sleeve 64' to lock under the bottom surface 78' of the retainer member 70' within the recesses 86'. The filler tube assembly 10' is now permanently attached to the fuel tank 48' and the crimping tool may be removed from the filler tube assembly.

To remove the crimping tool 96' from the filler tube assembly 10' the ram member 128' is actuated downwardly in the direction of the trailing end 32' of the inlet tube 12' until the ram member 128' again becomes normally positioned. The crimping tool 96' is then removed from the filler tube assembly 10' by withdrawing the guide member 112' from the axial bore 34' of the inlet tube 12'. As the guide member 112' is removed the bearings 126' engage the inner surface 36' of the inlet tube diameter portions causing the bearings 126' to be pushed inwardly to seat against the shaft 130' of the ram member 128'.

While the above description constitutes the preferred embodiments of the present invention, it is to be appreciated that the invention is susceptible to modification, variation and change without departing from the proper scope and fair meaning of the accompanying claims. For example, it should be apparent to those skilled in the art that sealing means other than the gasket and O-ring sealing elements previously described could be utilized herein. Commercially available liquid sealers which harden over a relatively short period of time would serve the same purpose. Further, the inlet tubes described herein could be altered in design and yet be utilized in the filler tube assembly embodiments according to the teachings of the present invention.

We claim:

1. A filler tube assembly, comprising:
    a selectively deformable tube having a plurality of diameter sections disposed between first and second ends wherein at least one of said diameter sections include radially outwardly expanding portions, said tube further including a radially projecting annular flange disposed between said first and second ends;
    a tank for receiving said tube, said tank including a body and a sealing arrangement having a projecting annular sleeve for hosting said tube, said annular sleeve including a plurality of radially outwardly expanded portions which are disposed contiguously over said radially outwardly expanded portions of said tube;
    sealing means disposed between said filler tube and said tank; and
    a retainer member which is disposable over said annular sleeve adjacent to said tank;
    whereby said radially outwardly expanded portions of said tube and said annular sleeve overlap a portion of said retainer member.

2. The filler tube assembly according to claim 1, wherein said retainer member includes means for precluding rotation of said tube within said tank.

3. The filler tube assembly according to claim 2, wherein said means for precluding rotation of said tube within said tank includes a plurality of extending lugs spaced apart by recessed portions, whereby said recessed portions receive said radially outwardly expanded portions of said annular sleeve and said tube.

4. The filler tube assembly according to claim 3, wherein said retainer member has an overall ring shape.

5. The filler tube assembly according to claim 4, wherein said retainer member includes a top portion including a first top surface and a second top surface disposed below said first top surface, whereby said lugs project upwardly from said first top surface.

6. The filler tube assembly according to claim 5, wherein said retainer member further includes a bottom surface having a downwardly extending annular portion disposed about the periphery of said bottom surface.

7. The filler tube assembly according to claim 4, wherein said retainer member includes a top surface and a bottom surface, wherein said top surface has a larger circumference than said bottom surface, said plurality of lugs extending from said bottom surface.

8. The filler tube assembly of claim 4, wherein said retainer member is formed from rolled gage steel.

9. The filler tube assembly according to claim 1, wherein said tube includes a first diameter portion and a second reduced diameter portion separated by a step which facilitates attachment of a quick connect coupling.

10. The filler tube assembly according to claim 1, wherein said sealing arrangement further includes a downwardly tapering section and an annular recess for hosting said radially projecting annular flange.

11. The filler tube assembly according to claim 1, wherein said sealing means include an elastomeric seal.

12. A filler tube assembly, comprising:
a selectively deformable tube having a first diameter portion, a second reduced diameter portion extending from said first diameter portion, a third diameter portion leading a fourth diameter portion, said third diameter having an increasing diameter in the direction of said fourth diameter portion, said fourth diameter portion having a plurality of radially outwardly expanded projections, a fifth diameter portion and a radially projecting annular flange disposed between said fourth and fifth diameter portions;
a tank for receiving said filler tube, said tank including a body and a sealing arrangement, said sealing arrangement including a downwardly tapering section, an annular recess and an extending annular sleeve having a plurality of radially outwardly expanded projections which are disposed contiguously over said radially outwardly expanded projections of said tube;
sealing means disposed between said tube and said tank; and
a retainer member disposed over said annular sleeve, said retainer member having a plurality of lugs spaced apart by recessed areas wherein the radially outwardly expanded projections of said tube and said annular sleeve overlap said retainer member along said recessed areas to lock said tube to said tank.

13. The filler tube assembly according to claim 12, wherein said retainer member has an overall ring shape.

14. The filler tube assembly according to claim 13, wherein said retainer member includes a top surface and a bottom wherein said top surface has a larger circumference than said bottom surface, whereby said plurality of lugs extend from said bottom surface.

15. The filler tube assembly of claim 13, wherein said retainer member is formed from hot rolled gage steel.

16. The filler tube assembly according to claim 12, wherein said retainer member includes a first top surface and a second top surface disposed below said first top surface, whereby said lugs project upwardly from said first top surface.

17. The filler tube assembly according to claim 14, wherein said retainer member further includes a bottom surface having a downwardly extending annular portion disposed about the periphery of said bottom portion.

18. The filler tube assembly according to claim 12, wherein a step is provided between said first and second diameter portions to facilitate attachment of a quick connect coupling.

19. The filler tube assembly according to claim 12, wherein said annular flange is disposed contiguously against said annular recess.

20. The filler tube assembly according to claim 12, wherein said sealing means include an elastomeric seal.

* * * * *